Figure 3:
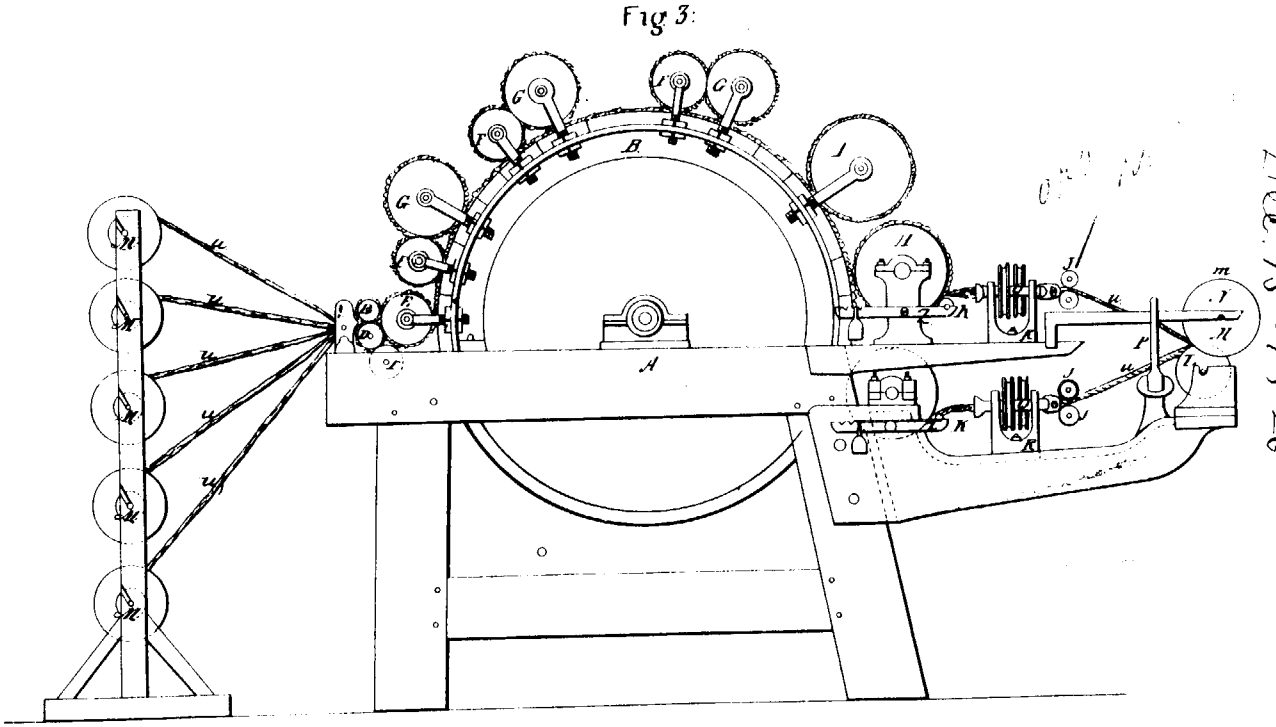
Figure 1:
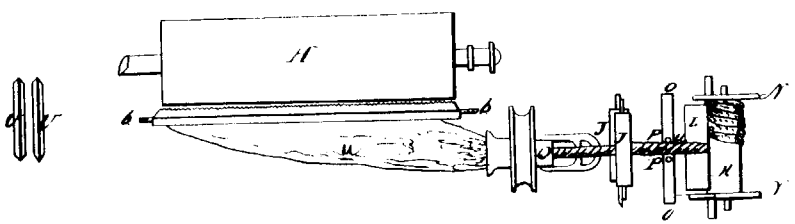
Figure 6:
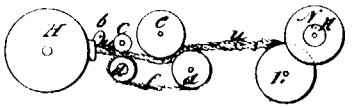

57-327 AU 244 EX INVENTORS ROOM
OR RX 097

1.4

NO PRINTED SPECIFICATION AVAILABLE.

2 Sheets. Sheet 1.

J Goulding,
Carding Machine.

97 X

Reissued July 29, 1836.

Orig - 4605 X
Dec. 15 - 1826

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # Rx 97 FOR ISSUE DATE 7-29-1836

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa